No. 784,566. PATENTED MAR. 14, 1905.
G. J. HOSKINS.
LOCKING BAR PIPE.
APPLICATION FILED AUG. 2, 1904.
2 SHEETS—SHEET 1.
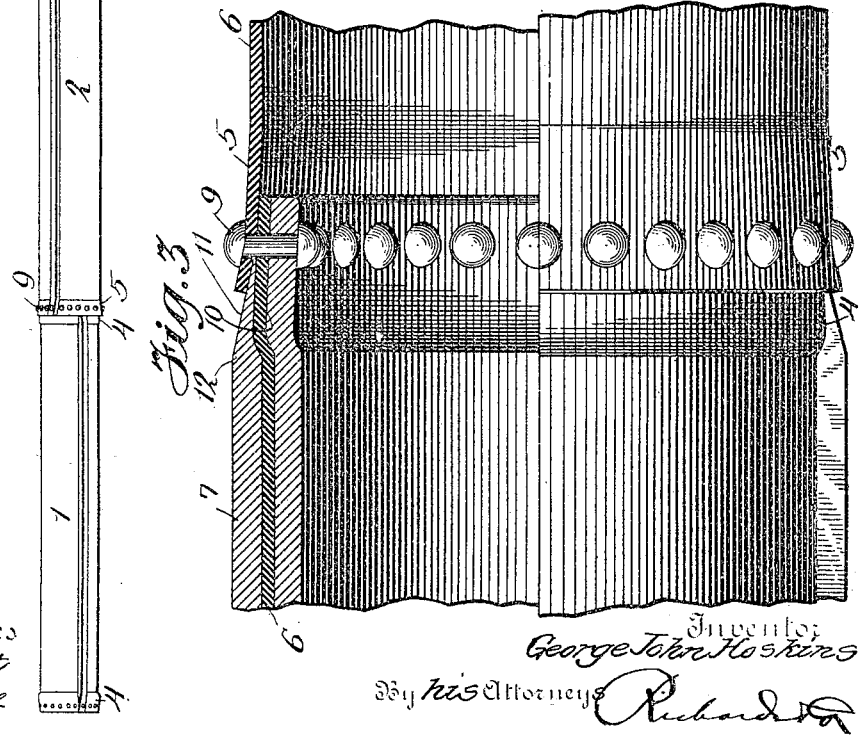
Witnesses
Chas. F. Clagett
N. H. Kuehne
Inventor:
George John Hoskins
By his Attorneys
Richards & Co.

No. 784,566. PATENTED MAR. 14, 1905.
G. J. HOSKINS.
LOCKING BAR PIPE.
APPLICATION FILED AUG. 2, 1904.
2 SHEETS—SHEET 2.
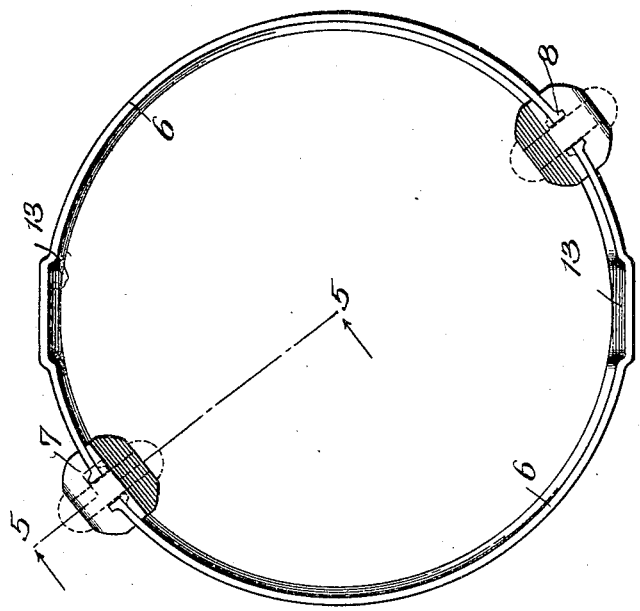
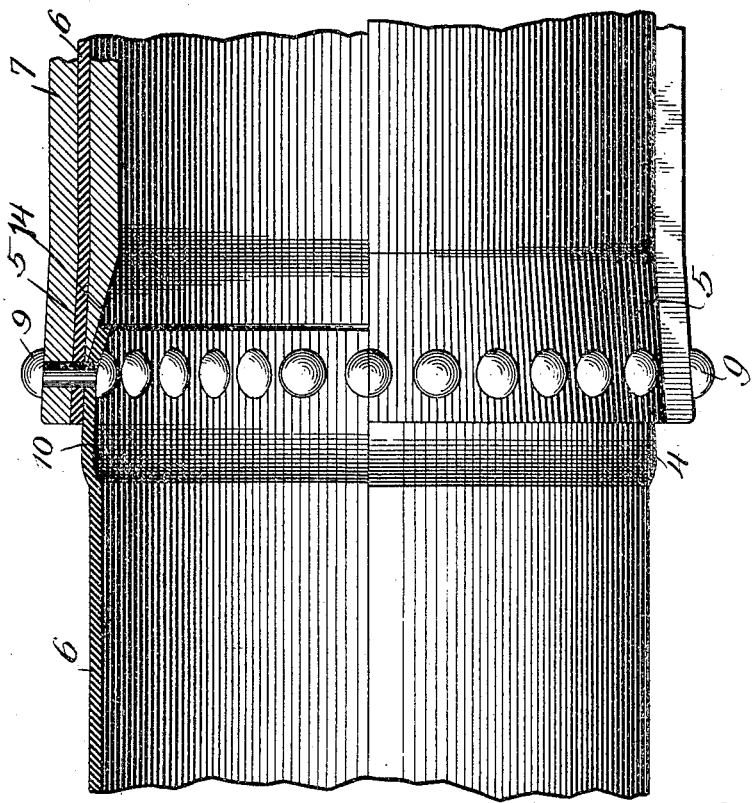
Witnesses
Chas. F. Clagett
N. M. Kuehne
Inventor
George John Hoskins
By his Attorneys
Richard R.

No. 784,566.

Patented March 14, 1905.

UNITED STATES PATENT OFFICE.

GEORGE JOHN HOSKINS, OF ULTIMO, SYDNEY, NEW SOUTH WALES, AUSTRALIA.

LOCKING-BAR PIPE.

SPECIFICATION forming part of Letters Patent No. 784,566, dated March 14, 1905.

Application filed August 2, 1904. Serial No. 219,244.

*To all whom it may concern:*

Be it known that I, GEORGE JOHN HOSKINS, a subject of the King of Great Britain, and a resident of Ultimo, Sydney, in the State of New South Wales, Australia, have invented a certain new and useful Improvement in Locking-Bar Pipe, of which the following is a specification, taken in connection with the accompanying drawings, which form a part of the same.

This invention relates to locking-bar pipe, and relates especially to the formation of joints for such pipe.

In the accompanying drawings, in which the same reference-numerals refer to similar parts in the several figures, Figure 1 shows several sections of locking-bar-pipe joint according to this invention. Fig. 2 is a diagrammatic view of the same as located in a trench. Fig. 3 is an enlarged elevation, partly in section, on the line 3 3 of Fig. 4. Fig. 4 is an end view of one pipe-section. Fig. 5 is a longitudinal view, partly in section, on the line 5 5 of Fig. 6. Fig. 6 is an end view of one of the pipe-sections.

In the embodiment of this invention illustrated in the drawings the locking-bar pipe is formed of the pipe-plates 6, provided with the flanged edges 8 and firmly held together to form pipe-sections by the locking-bars 7. The ends of the pipe-sections are preferably formed of a general conical configuration in order to more readily and securely join the same.

The pipe-section 1 in Fig. 1 is indicated as provided with two tapering ends 4. The pipe-section 2 has two flaring ends 5, although, if desired, each pipe-section may have one tapering and one flaring end, as is indicated in the case of the pipe-section 3. As is seen in Fig. 3, the tapering end 4 may be formed on the end of the pipe-section by producing a suitable tapering enlargement 10 in the pipe-plates 6 and also in the adjacent locking-bars, so that the diameter of the pipe is not unduly reduced, although such a tapering enlargement is not in all cases necessary. The external locking-bar 7 at the end of the section is preferably formed substantially flush with the adjacent pipe-plates, and this may be done by removing a portion of the end of this locking-bar. The locking-bar is also preferably reduced adjacent the flush portion, and this reduced part may be given the form of a bevel 11, which, as indicated, starts from the point 12.

As indicated in Fig. 5, flaring ends 5 may be formed on the pipe-sections, if desired, by giving the pipe-plates and adjacent locking-bars a suitable flare for a short distance at the ends of the sections. The coöperating or engaging surfaces of the two pipe-sections which are to be joined are preferably in this case also made substantially smooth for a distance at the end of the section by making the end of the locking-bar 7 substantially flush with the pipe-plates 6 at this point by removing it or otherwise. The end of this locking-bar, which, as is indicated, is on the inside of the pipe in this instance, is also preferably reduced for a suitable distance adjacent the flush surface, and this reduced part may be given the form of a bevel 14. Suitable recesses may be formed in the coöperating surfaces of the ends of the pipe-sections to accommodate these reduced portions of the locking-bars. The recesses 15 (shown in Fig. 4) are provided to accommodate the reduced portions 14 of the locking-bars, and in a similar way the recesses 13 accommodate the reduced portions 11 on the other pipe-section. By forming these tapering and flaring ends on the pipe-sections they may be more readily forced together in laying the pipe and a more close contact secured. When in proper position, the pipe-sections are joined by any suitable means, the rivets 9 being indicated for this purpose. A perfectly tight joint may be insured by calking in the usual manner or by other means. The resulting joint is not only readily formed, but is strong and reliable, since the strength of the pipes is not unduly impaired in forming the joint, the locking-bars having sufficient cross-section at the joint to insure the circumferential strength of the pipe at this point in connection with the pipe-plates on the other section. The locking-bars of adjoining pipe-sections are preferably slightly out of alinement, as is indicated in Fig. 2, the locking-bars of the several pipe-sections being indicated as 7 7.

It is of course understood that many variations in the form, proportion, size, and number of parts may be made by those familiar with this art. Parts of the same may be omitted and parts may be connected with other devices without departing from this invention or losing the advantages of the same. I do not, therefore, desire to be limited to the details of the disclosure which has been made in this case; but

What I claim as new, and what I desire to secure by Letters Patent, is set forth in the appended claims:

1. In combination, pipe-plates, locking-bars between said pipe-plates forming pipe-sections provided with flaring and tapering ends, said locking-bars being beveled externally and internally adjacent said flaring and tapering ends respectively and being formed flush with the coöperating surfaces of the adjacent pipe-plates at the ends of said pipe-sections, there being recesses formed in the ends of said pipe-sections to accommodate the ends of said locking-bars and rivets to hold said pipe-sections together.

2. In combination, pipe-plates, locking-bars between said pipe-plates forming pipe-sections provided with flaring and tapering ends, said locking-bars being reduced externally and internally adjacent said flaring and tapering ends respectively, there being recesses formed in the ends of said pipe-sections to accommodate the ends of said locking-bars.

3. In combination, pipe-plates, locking-bars between said pipe-plates to form a pipe-section provided with a flaring and a tapering end, said locking-bars being beveled externally and internally adjacent said flaring and tapering ends respectively and being formed substantially flush with the coöperating surfaces of the adjacent pipe-plates at the ends of said pipe-section, there being recesses formed in the ends of said pipe-sections to accommodate the ends of the locking-bars of adjoining pipe-sections.

4. In combination, pipe-plates, locking-bars between said pipe-plates forming a pipe-section, said locking-bars being beveled externally and internally adjacent the coöperating surfaces of the ends of said pipe-section and said locking-bars being formed substantially flush with the coöperating surfaces of the adjacent pipe-plates at the ends of said section, there being recesses formed in the ends of said pipe-section to accommodate the ends of the locking-bars of adjoining pipe-sections.

5. In combination, pipe-plates, locking-bars between said pipe-plates forming a pipe-section, said locking-bars being reduced externally and internally adjacent the ends of said section and being formed substantially flush with the coöperating surfaces of the adjacent pipe-plates at the ends of said section, there being recesses formed in the ends of said pipe-section to accommodate the ends of the locking-bar of adjacent pipe-sections.

6. In combination, pipe-plates, locking-bars between said pipe-plates forming pipe-sections provided with flaring and tapering ends, said locking-bars being beveled externally and internally adjacent said flaring and tapering ends respectively and being formed flush with the coöperating surfaces of the adjacent pipe-plates at the ends of said pipe-sections, there being recesses formed in the ends of said pipe-sections to accommodate the ends of said locking-bars and rivets to hold said pipe-sections together, said rivets passing through the beveled ends of said locking-bars to hold them in proper position with respect to said pipe-plates.

In testimony whereof I have signed my name to this specification in the presence of two subscribing witnesses.

GEORGE JOHN HOSKINS

Witnesses:
   JOHN PHILIP KNIGHT,
   OTTO MUNK.